(12) United States Patent
Tauser et al.

(10) Patent No.: US 7,224,518 B2
(45) Date of Patent: May 29, 2007

(54) FIBER-OPTIC AMPLIFICATION OF LIGHT PULSES

(75) Inventors: Florian Tauser, München (DE); Alfred Leitenstorfer, Constance (DE)

(73) Assignee: Toptica Photonics AG, Graefelfing (DE)

( * ) Notice: Subject to any disclaimer, the term of this patent is extended or adjusted under 35 U.S.C. 154(b) by 0 days.

(21) Appl. No.: 10/787,000

(22) Filed: Feb. 25, 2004

(65) Prior Publication Data

US 2004/0190119 A1 Sep. 30, 2004

(30) Foreign Application Priority Data

Feb. 25, 2003 (DE) .............................. 103 08 249
Feb. 23, 2004 (DE) .................... 10 2004 009 068

(51) Int. Cl.
*H01S 3/00* (2006.01)
*H04B 10/18* (2006.01)

(52) U.S. Cl. ............................ 359/337.5; 359/337.4; 372/25

(58) Field of Classification Search ................. 372/25; 359/337.5, 337.4
See application file for complete search history.

(56) References Cited

U.S. PATENT DOCUMENTS

| | | | | |
|---|---|---|---|---|
| 4,972,423 A * | 11/1990 | Alfano et al. | .................. | 372/25 |
| 5,235,606 A * | 8/1993 | Mourou et al. | ................ | 372/25 |
| 5,400,350 A * | 3/1995 | Galvanauskas | ............... | 372/20 |
| 5,499,134 A * | 3/1996 | Galvanauskas et al. | ...... | 359/333 |
| 5,617,434 A * | 4/1997 | Tamura et al. | .................. | 372/6 |
| 5,627,848 A * | 5/1997 | Fermann et al. | ............... | 372/18 |
| 5,633,885 A * | 5/1997 | Galvanauskas et al. | ....... | 372/25 |
| 5,696,782 A * | 12/1997 | Harter et al. | .................. | 372/25 |
| 5,701,319 A * | 12/1997 | Fermann | ....................... | 372/18 |
| 5,720,894 A * | 2/1998 | Neev et al. | ................... | 216/65 |
| 5,818,630 A * | 10/1998 | Fermann et al. | ........ | 359/341.31 |
| 5,847,863 A * | 12/1998 | Galvanauskas et al. | .. | 359/341.3 |
| 5,862,287 A * | 1/1999 | Stock et al. | ................. | 385/123 |
| 5,880,877 A * | 3/1999 | Fermann et al. | ........ | 359/341.31 |
| 6,141,362 A * | 10/2000 | Meyerhofer et al. | ........... | 372/30 |
| 6,154,310 A * | 11/2000 | Galvanauskas et al. | ..... | 359/328 |
| 6,163,638 A * | 12/2000 | Eggleton et al. | ............... | 385/37 |
| 6,181,463 B1 * | 1/2001 | Galvanauskas et al. | ..... | 359/330 |
| 6,198,568 B1 * | 3/2001 | Galvanauskas et al. | ..... | 359/332 |
| 6,272,156 B1 * | 8/2001 | Reed et al. | .................... | 372/25 |
| 6,275,512 B1 * | 8/2001 | Fermann | ........................ | 372/6 |
| 6,334,011 B1 * | 12/2001 | Galvanauskas et al. | ........ | 385/22 |
| 7,072,101 B2 * | 7/2006 | Kapteyn et al. | ........... | 359/337.5 |
| 2001/0024458 A1 * | 9/2001 | Fermann | ........................ | 372/6 |
| 2002/0001321 A1 * | 1/2002 | Perry | ........................... | 372/22 |
| 2003/0156605 A1 * | 8/2003 | Richardson et al. | ........... | 372/25 |

FOREIGN PATENT DOCUMENTS

EP 1 118 904 7/2001

OTHER PUBLICATIONS

Dispersion (optics). Wikipedia: The world's free encyclopedia. http://en.wikipedia.org/wiki/Dispersion_(optics) DLed: Oct. 12, 2005 Posted: Jan. 21, 2003.*

(Continued)

*Primary Examiner*—Jack Keith
*Assistant Examiner*—Ari M. Diacou
(74) *Attorney, Agent, or Firm*—Collard & Roe, P.C.

(57) ABSTRACT

A device for amplifying light pulses has an optical stretcher, in which the light pulses of a pulsed laser light source are temporally stretched, and an optically pumped amplifier fiber, in which the light pulses are amplified and, at the same time, temporally compressed. In order to improve such a system with regard to the pulse duration and the pulse energy that can be achieved, the amplifier fiber has a positive group velocity dispersion, whereby the amplifier fiber has non-linear optical properties, so that the optical spectrum of the light pulses is broadened during the amplification process, taking advantage of non-linear self-phase modulation.

8 Claims, 2 Drawing Sheets

OTHER PUBLICATIONS

Dispersion (optics). Wikipedia: The world's free encyclopedia. http://en.wikipedia.org/wiki/Dispersion_(optics) DLed: Oct. 12, 2005 Posted: Jan. 20, 2004.*

Dispersion (optics). Wikipedia: The world's free encyclopedia. http://en.wikipedia.org/wiki/Dispersion_(optics) DLed: Oct. 12, 2005 Posted: Oct. 5, 2005.*

Agrawal, Govind P. Fiber-Optic Communication Systems 2nd Ed. Wiley Publishers, New York, 1997. pp. 62-63.*

K. Tamura et al. (1993) "77-fs pulse generation from a stretched-pulse mode-locked all-fiber ring laser", *Optics Letters* 18:1080-1082.

T. Okuno et al. (1999) "Silica Based Functional Fibers with Enhanced Nonlinearity and Their Applications", *IEEE Journal of Selected Topics of Quantum Electronics* 5:1385-1391.

* cited by examiner

FIBER-OPTIC AMPLIFICATION OF LIGHT PULSES

CROSS REFERENCE TO RELATED APPLICATIONS

Applicants claim priority under 35 U.S.C. §119 of German Application Nos. 103 08 249.2 and 10 2004 009 068.8 filed Feb. 25, 2003 and Feb. 23, 2004, respectively.

BACKGROUND OF THE INVENTION

1. Field of the Invention

The present invention relates to a device for amplification of light pulses, having an optical stretcher, in which the light pulses of a pulsed laser light source are temporally stretched, and having an optically pumped amplifier fiber, in which the light pulses are amplified and temporally compressed.

2. The Prior Art

Laser systems that are able to produce femtosecond light pulses are increasingly being used in basic physical research and also in other areas of research. Using such laser systems, it is possible to observe rapid physical, chemical, and biological processes essentially in "real time." Commercial areas of use for laser systems that produce femtosecond light pulses exist in the fields of materials examination and processing, in the field of medicine, as well as in the so-called "life science" field. Concrete applications that can be mentioned as examples are multi-photon microscopy as well as optical coherence tomography.

Furthermore, only a few years ago, the use of phase-stabilized laser systems for producing femtosecond light pulses as highly precise frequency references became known. This development makes it possible, for example, to measure optical transitions with great accuracy. By means of a direct link between the optical spectrum range and the most precise clocks, at this time, in the range of microwave and radio frequencies, such systems replace complicated and expensive frequency division chains. In the field of optical frequency metrology, as well, there are interesting areas of application for laser systems that produce femtosecond light pulses.

Passive-mode-coupled glass-fiber laser systems that yield light pulses having pulse durations of $\leq 100$ femtoseconds have been known for several years and have become established in optical laboratories. Fiber-based laser systems have the advantage of a particularly great cost efficiency, and a very low maintenance and adjustment expense. In addition, as compared with free-beam laser systems, extremely compact units can be achieved. In the case of the fiber-based systems, optical fibers doped with rare earths are generally used as the laser-active medium. When using fibers doped with erbium, an emission wavelength in the range of 1.55 µm is obtained. It is preferable if laser systems that emit in this wavelength range are compatible with a large number of optical components that are used in the sector of telecommunications technology. However, it must be stated that fiber-based laser systems have disadvantages, as compared with the known titanium-sapphire free-beam laser systems, with regard to the pulse duration and pulse energy that can be achieved. In the case of pulse durations of $\leq 100$ femtoseconds, at this time it is possible to achieve pulse energies of only about 100 picojoules, using purely fiber-based laser systems. The comparatively low light intensity that results, however, is insufficient for many applications, particularly in the field of non-linear optics.

It has therefore been shown that in order to achieve pulse energies of a nanojoule and more, it is necessary to further amplify the light pulses produced by known fiber-based laser systems. A device that is suitable for this purpose is previously known from U.S. Pat. No. 5,880,877, for example. In the previously known system, an optically pumped amplifier fiber is used, in which the light pulses produced by a pulsed laser light source are amplified. In this connection, the amplifier fiber has a negative group velocity dispersion in the corresponding wavelength range (i.e. the fiber is operated in the anomalous-dispersion regime). The solitonic optical effects that are promoted thereby are utilized, in the previously known system, in order to generate light pulses with an extremely short pulse duration, in the range of 30 femtoseconds. It is problematic that although the corresponding solitones have a short and intense peak, pulse wings having a temporally wide spread are formed, and that a significant part of the total pulse energy goes to these pulse wings. In order to eliminate this undesirable temporal pulse shape, a frequency doubler is used in the previously known system, which is a medium having non-linear optical properties. Because of their comparatively low intensity, the aforementioned pulse wings do not contribute to the frequency-doubled light pulse, so that in total, a correction of the temporal pulse shape is achieved. A significant disadvantage of the previously known system is that, for one thing, a significant energy loss is unavoidably connected with the frequency doubling. Furthermore, the wavelength of the generated light pulses leave the technologically interesting wavelength range around 1.55 µm, because of the frequency doubling.

SUMMARY OF THE INVENTION

It is therefore an object of the present invention to provide a device that allows the production of femtosecond light pulses having a high energy, purely by using fiber optics. In this connection, the disadvantages described above, which are attributable to the frequency doubling, should be avoided as far as possible.

These and other objects are achieved, according to the invention, by providing a device for amplification of light pulses having an optically pumped amplifier fiber with a positive group velocity dispersion (i.e. the fiber is operated in the normal-dispersion regime). The amplifier fiber has non-linear optical properties so that the optical spectrum of the light pulses is broadened, taking advantage of non-linear self-phase modulation during the amplification process.

The essential basic idea of the invention is the use of an optical stretcher for temporal stretching of the light pulses, in combination with an optically pumped amplifier fiber having a positive group velocity dispersion, for amplification and, at the same time, temporal compression of the light pulses.

Because of the positive group velocity dispersion of the amplifier fiber, the occurrence of solitones with disadvantageous, temporally widely expanded wings is prevented. In addition, the positive group velocity dispersion of the amplifier fiber results in a temporal shortening of the light pulses, and thereby the temporal stretching of the light pulses achieved with the optical stretcher is compensated. The non-linear self-phase modulation that occurs during the amplification of the light pulses, within the amplifier fiber, according to the invention, also results in a broadening of the optical spectrum of the light pulses, so that in the end result, light pulses that are temporally shorter than the light pulses originally produced by the laser light source can be generated. By means of optimally adapting the length of the amplifier fiber of the device according to the invention, light pulses having a pulse duration of clearly ≦100 femtoseconds are available at the output of the amplifier fiber. Thereby a completely fiber-based laser system can be implemented, which yields femtosecond light pulses having a high pulse energy.

It is practical if, in the case of the device according to the invention, the stretcher precedes the amplifier fiber, so that, as outlined above, the temporal stretching of the light pulses is compensated on the basis of the optical properties of the amplifier fiber. In this connection, it is advantageous if the optical stretcher is configured as an optical fiber having a negative group velocity distribution, i.e. the fiber is operated in the anomalous-dispersion regime. A conventional telecommunications glass fiber having a negative group velocity dispersion can be used in the device according to the invention. A photonic crystal fiber can serve in laser systems having short-wave emission, to achieve the stretching at a negative group velocity dispersion.

In the device according to the invention, it is practical if a system that yields femtosecond light pulses having a pulse energy of up to 100 picojoules is used as the pulsed laser light source. Such systems are commercially available at low cost.

Optionally, the light pulses amplified using the device according to the invention can be coupled out of the amplifier fiber and passed to an optical compressor for further temporal compression, as a free beam. Such a compressor, such as a prism compressor, for example, allows a precise adjustment of the temporal frequency behavior or "chirp" of the light pulses. In addition, the compressor can be utilized in order to achieve minimal pulse durations. Experiments have shown that it is possible, using the device according to the invention, to generate light pulses that do not have the undesirable, temporally widely expanded pulse wings, whereby if the amplifier fiber is additionally followed by a prism compressor, the achievable pulse duration lies in the range of only 65 femtoseconds. At the same time, the achievable pulse energy is 1.5 nanojoules and more.

It is practical if commercially available laser diodes are used for optical pumping of the amplifier fiber of the device according to the invention. An amplifier fiber doped with erbium, for example, can be optically pumped by one or two laser diodes, which work at wavelengths of 980 nm or 1480 nm. Suitable laser diodes have a power consumption of less than a watt, so that complicated temperature stabilization is unnecessary. In total, the device according to the invention can therefore advantageously be operated at an electric power of a few watts.

In the device according to the invention, an optical fiber doped with erbium ions or with other rare earths (such as Nd, Er, Yb, Pr, Tm, or Ho) can therefore be used as the amplifier fiber. This use is dependent on the desired pump efficiency as well as on the wavelength of the light pulses to be amplified.

An interesting use of the device according to the invention, in the field of optical frequency metrology, is achieved if the amplified light pulses are coupled into an additional, highly non-linear optical fiber. Because of the high energy of the light pulses, extreme non-linearity results in the additional, highly non-linear optical fiber. This non-linearity results in drastic modification of the optical spectrum of the light pulses. As an end result, light pulses whose spectrum corresponds to a frequency comb covering more than one optical octave are generated. Using the device according to the invention, an optical frequency comb in the wavelength range between 950 nm to 2 µm can be generated. The width of the optical frequency comb can be adjusted, in this connection, by means of a suitable determination of the length of the additional, highly non-linear optical fiber.

It is known that optical frequency combs are very useful for measuring optical frequency intervals. An optical frequency comb is made up of a great number of modes that have a constant distance from one another. It is known that particularly broad frequency combs can be generated using laser light sources that emit femtosecond light pulses. Such a laser oscillates on many modes simultaneously, which are in a fixed phase relationship with one another. The distance between the individual modes corresponds to the repetition rate at which the light pulses are being emitted. To characterize an optical frequency comb, an offset frequency value must also be taken into consideration, which determines the absolute position of the comb in the frequency space.

To implement an optical synthesizer for optical frequency metrology, it is necessary to generate optical frequency combs that span more than one optical octave and have a sufficiently high pulse repetition rate. These optical frequency combs are necessary because only a full optical octave allows simple determination of the aforementioned offset frequency, and thereby a complete characterization of the optical frequency comb. If the optical frequency comb spans more than one optical octave, the long-wave mode of the frequency comb can be frequency-doubled and brought into interference with a corresponding short-wave mode. The offset frequency value being searched for can be determined directly on the basis of the beat frequency.

Accordingly, it is practical if the device according to the invention, for characterizing the optical frequency comb, has an interferometer that follows the highly non-linear fiber. Using the interferometer, the offset frequency value can be determined in the manner outlined above. Together with the repetition rate of the laser light source, which can be measured without problems, the optical frequency comb is then completely characterized, so that the device can be used for highly accurate measurement of optical frequency intervals.

It is advantageous if the possibility exists, for the purpose of active stabilization, to pass an output signal of the interferometer to the pulsed laser light source of the device according to the invention. In this way, the offset frequency value that was mentioned, in particular, can be actively stabilized at a desired value. The spectrum of the generated optical frequency comb is thereby calibrated in absolute terms, so that in total, a self-referencing targeted synthesis of optical frequencies is possible at great stability. In this connection, the optical frequency comb that was achieved lies in the range of telecommunications wavelengths, so that the device according to the invention has a great potential for use.

In a further embodiment, the device has a second optical amplifier to which part of the light emitted by the pulsed laser light source is passed. In this connection, the laser light source that was actively stabilized in the manner described above supplies two optical amplifiers, at the same time. In this way, the second optical amplifier can be individually adapted to the purpose of use, in each instance. Therefore light pulses can be emitted by way of the second optical amplifier, which have a spectrum that corresponds to a stabilized and precisely characterized optical frequency comb. Optionally, a frequency converter, e.g. a frequency doubler, can follow the second optical amplifier, in order to enlarge the wavelength range as needed.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
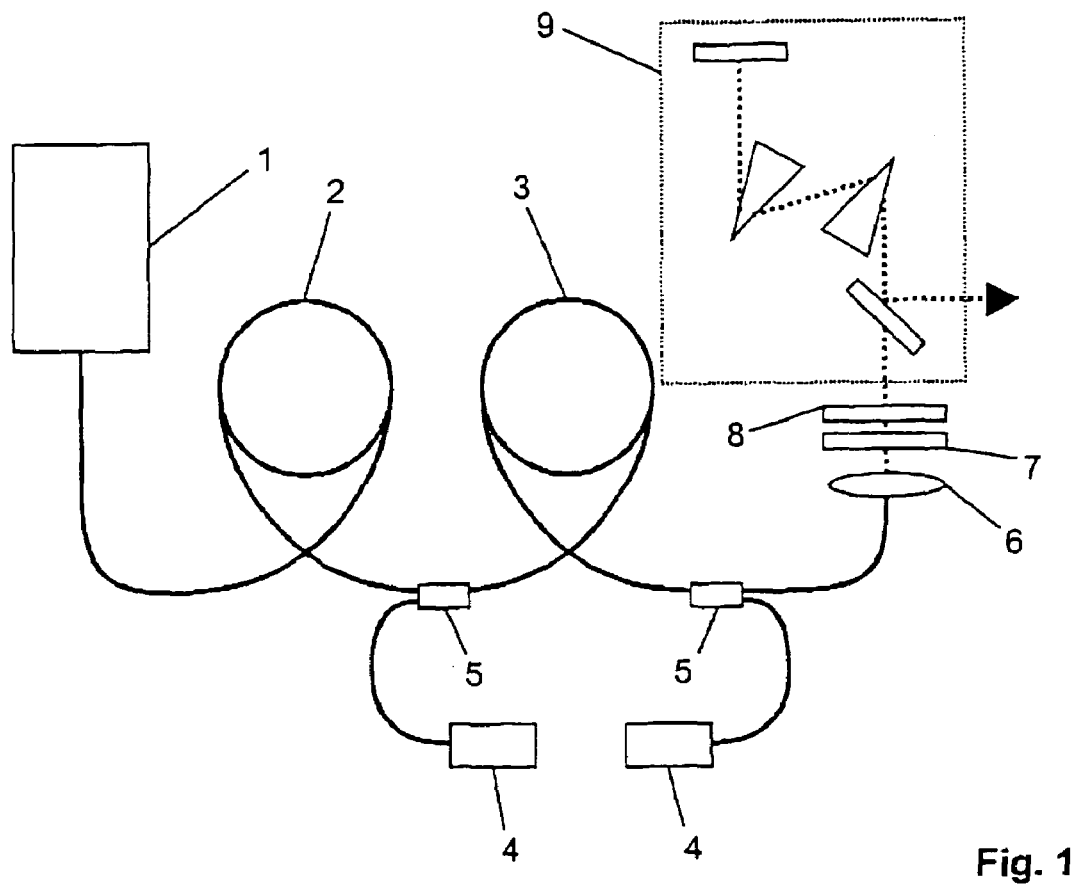
FIG. 1 is a schematic representation of the device according to an embodiment of the invention.

Turning now in detail to the drawings, the device shown in FIG. 1 has a pulsed laser light source 1. Light source 1 produces fiber-coupled femtosecond light pulses having a low power. In experiments, a laser source that emits light pulses having a pulse energy of 45 picojoules at a repetition rate of 67 MHz has proven itself. A purely fiber-based laser light source that can be used in the device according to the invention is described, for example, in the article by Tamura et al. in Optics Letters, Volume 18, page 1080, 1993.

The light pulses emitted by laser light source 1 are coupled into a commercially available telecommunications fiber 2. Fiber 2 (which is a fiber operated in the anomalous-dispersion regime) has a negative group velocity dispersion (e.g. $-0.023$ $ps^2/m$). In the embodiment shown in FIG. 1, fiber 2 functions as an optical stretcher, in which the light pulses of pulsed laser light source 1 are temporally stretched. The stretched light pulses then pass through an optically pumped amplifier fiber 3, which is an optical fiber highly doped with erbium ions (500 to 1000 ppm). According to the invention, amplifier fiber 3 (which is a fiber operated in the normal-dispersion regime) has a positive group velocity dispersion (e.g. $+0.057$ $ps^2/m$), so that the occurrence of solitonic optical effects in amplifier fiber 3 is prevented. The doping of amplifier fiber 3 is such that attenuation of the light (wavelength 1.5 µm) that passes through the fiber, by 80 decibels per meter, occurs without optical pumping. Amplifier fiber 3 is pumped by two laser diodes 4, in the device shown in FIG. 1, which work at a wavelength of 980 nm or 1480 nm. In experiments, laser diodes having an output power of 200 mW each were used. The light of the laser diodes is coupled into amplifier fiber 3 by way of so-called wavelength-division multiplexing or WDM couplers 5. Amplifier fiber 3 has non-linear optical properties, which has the result that during the amplification process, the optical spectrum of the light pulses temporally stretched by means of fiber 2 is broadened, taking advantage of non-linear self-phase modulation. Because of the positive group velocity dispersion of amplifier fiber 3, the light pulses that were previously stretched using fiber 2 are also temporally compressed. At the output of amplifier fiber 3, light pulses are therefore available that have a pulse duration of $\leq 100$ femtoseconds. In order to prevent the occurrence of excessive non-linearity, the light pulses are coupled out of amplifier fiber 3 by means of a lens 6 after the amplification process. Two wave plates 7 and 8 are provided in order to adjust a horizontal polarization state of the light pulses. Alternatively, a fiber-optic polarization plate could also be used. Subsequently, the light pulses are compressed to a minimal pulse duration in a silicon prism compressor 9, through which they pass in two ways. To prevent reflection losses within prism compressor 9, the prisms are arranged at the Brewster angle. In experiments, it was possible to achieve light pulses having a pulse duration of 65 femtoseconds and a pulse energy of 1.5 nanojoules at the output of the device shown. At a repetition frequency of 67 MHz, these pulses correspond to an average output power of 110 mW. Instead of the prism compressor, the use of a lattice compressor, a so-called "chirped" mirror, or a so-called fiber Bragg grating would also be easily possible.

Figure 2:
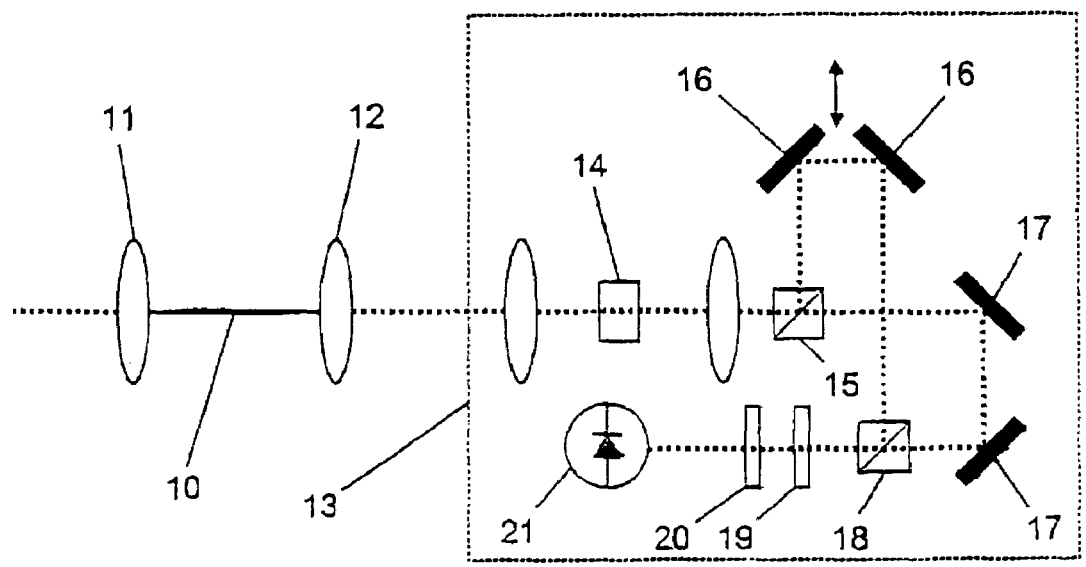
FIG. 2 is a schematic representation of an interferometer for characterizing an optical frequency comb.

FIG. 2 shows an optional expansion of the device according to the invention. In this embodiment is provided an additional, highly non-linear optical fiber 10, into which the amplified light pulses are coupled, in order to generate an optical frequency comb that covers more than one optical octave. A lens 11 is provided in order to couple the pulses into additional fiber 10. By means of another lens 12, the light pulses modified by means of fiber 10 are coupled out. However, it would be equally possible, depending on the case of use, to pass the light pulses directly from amplifier fiber 3 to the highly non-linear fiber 10, e.g. by means of a suitable splice connection. The highly non-linear optical fiber can be a glass fiber having a very small core diameter of $\leq 5$ µm. In experiments, a glass fiber having a core diameter of 3.7 µm was successfully used, in order to generate an optical frequency comb that included more than one optical octave. At wavelengths of less than 1.3 µm, the use of microstructured photonic crystal fibers of known type, as the highly non-linear fiber, is advantageous. In fiber 10, extreme, non-linear optical effects occur, which result in severe modifications of the optical spectrum of the light pulses. After less than 10 cm of traveling distance in fiber 10, the optical spectrum extends from approximately 950 nm to approximately 2 µm. With this range, the continuum produced has a band width of more than one octave. In experiments, a highly non-linear fiber 10 having a length of 7 cm was used. At a greater fiber length, the effectiveness of the non-linear processes decreases towards the output of fiber 10, and no further broadening of the spectrum occurs. If the fiber piece 10 is selected to be shorter, the spectrum of the generated optical frequency comb is narrower. By way of changing the length of the fiber piece 10, the spectrum of the exiting light pulses can therefore be continuously detuned, within certain limits. An interferometer 13 shown in FIG. 2 serves to characterize the optical frequency comb and, in particular, the offset frequency value, which determines the absolute position of the frequency comb in the frequency space. Long-wave modes of the frequency comb are first frequency-doubled in an optically non-linear crystal 14 (e.g. β-barium borate), so that a spectral overlap with the short-wave range of the optical spectrum is produced. The frequency-doubled light is spatially separated by means of a polarizing beam splitter 15. In order to balance out running time differences within highly non-linear fiber 10, mirrors 16 are provided in one arm of the interferometer shown, which form a variable optical delay segment. By way of additional mirrors 17 and a second polarizing beam splitter 18, the light beams are brought into superimposition on a silicon avalanche photodiode 21, after having passed through an interference filter 19 and a polarizer 20. An interference signal is detected by means of the photodiode 21. The repetition rate of the laser light source as well as the offset frequency value that is of interest can be read directly from the radio frequency spectrum of the interference signal.

Figure 3:
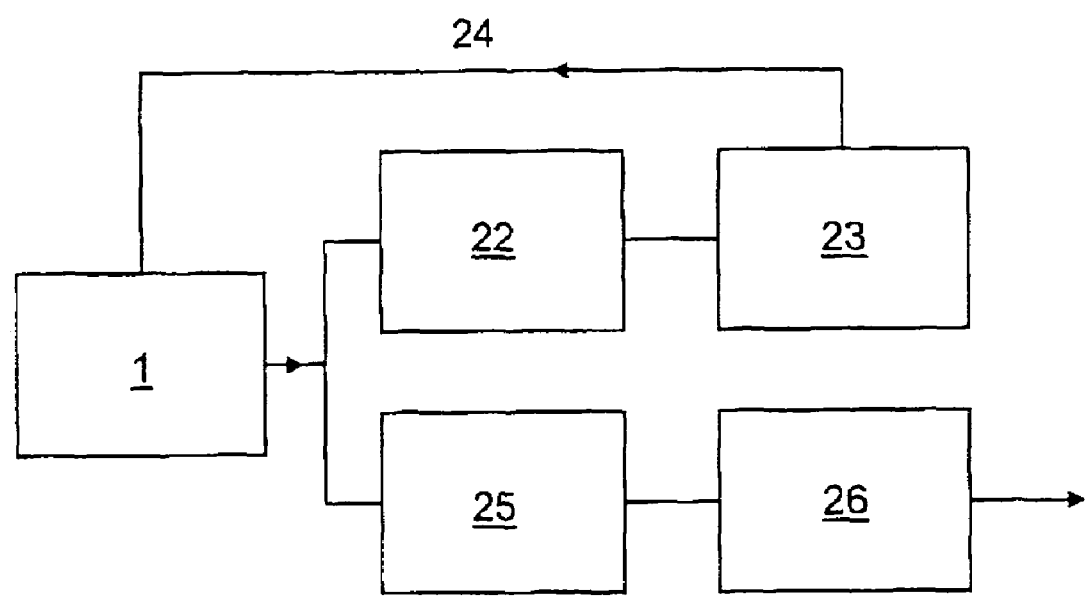
FIG. 3 is a device according to an embodiment of the invention, having two optical amplifiers.

FIG. 3 shows the expansion of the device according to the invention to produce a two-armed optical amplifier concept, in the form of a block schematic. In the device shown in FIG. 3, pulsed laser light source 1 supplies two amplifiers. In this connection, an amplifier 22 has essentially the same structure shown in FIG. 1. Amplifier 22 is followed by an optical measurement arrangement 23, by means of which the optical spectrum of the amplified light pulses is characterized. Measurement arrangement 23 can include an interferometer 13, as it is shown in FIG. 2. For the purpose of active stabilization, an output signal 24 of measurement arrangement 23 is passed to pulsed laser light source 1. Furthermore, a second optical amplifier 25 is provided, which can be designed as a function of the case of use, in each instance, e.g. second optical amplifier 25 can be optimized for the shortest possible output pulses or for maximum pulse energy. The comb structure of the optical spectrum of the light pulses from pulsed laser light source 1 is not lost in the amplification and, if applicable, subsequent frequency conversion processes. For example, the device can be expanded in such a manner, for example by way of a wavelength conversion in another highly non-linear optical fiber 26, if necessary in combination with a frequency doubler, that precisely characterized and stabilized frequency combs having a high power in the wavelength range from 500 nm to 2 µm, without gaps, are available at the output.

Although only a few embodiments of the present invention have been shown and described, it is to be understood that many changes and modifications may be made thereunto without departing from the spirit and scope of the invention as defined in the appended claims.

What is claimed is:

1. A device for amplifying light pulses comprising:
   (a) a pulsed laser light source for producing light pulses having an optical spectrum;
   (b) an optical stretcher coupled to the light pulses emitted by said laser light source, said optical stretcher comprising an optical fiber having a negative group velocity dispersion and temporally stretching the light pulses of said pulsed laser light source; and
   (c) an optically pumped amplifier fiber arranged to receive the light pulses from said optical stretcher, said amplifier fiber amplifying and temporally compressing the light pulses, said optical stretcher preceding said amplifier fiber;
   wherein said amplifier fiber has a positive group velocity dispersion and non-linear optical properties, said amplifier fiber broadening the optical spectrum of the light pulses during amplification of the light pulses by taking advantage of non-linear self-phase modulation.

2. The device according to claim 1, wherein said pulsed laser light source produces fiber-coupled femtosecond light pulses having a pulse energy of up to 100 picojoules.

3. The device according to claim 1, wherein amplified light pulses from said amplifier fiber pass to an optical compressor for further temporal compression.

4. The device according to claim 1, further comprising at least one laser diode for optical pumping of said amplifier fiber.

5. The device according to claim 1, further comprising a highly non-linear optical fiber, wherein amplified light pulses are coupled into said optical fiber for generating an optical frequency comb comprising more than one optical octave.

6. The device according to claim 5, further comprising an interferometer following said highly non-linear optical fiber for characterizing the optical frequency comb.

7. The device according to claim 6, wherein an output signal from said interferometer is passed to said pulsed laser light source for active stabilization.

8. The device according to claim 7, further comprising a second optical amplifier for receiving part of the light pulses emitted by said pulsed laser light source.

* * * * *